United States Patent [19]

Matsunaga et al.

[11] Patent Number: 4,580,871
[45] Date of Patent: Apr. 8, 1986

[54] ROTARY ENCODER

[75] Inventors: Hiroshi Matsunaga; Yoji Shimojima; Ichiro Tokunaga, all of Furukawa; Kosei Obata, Miyagi, all of Japan

[73] Assignee: Alps Electric Co., Ltd., Japan

[21] Appl. No.: 626,636

[22] Filed: Jul. 2, 1984

[30] Foreign Application Priority Data

Jun. 30, 1983 [JP] Japan ................ 58-100271[U]

[51] Int. Cl.⁴ .................... G02B 6/26; G02B 6/42
[52] U.S. Cl. ................................................. 350/96.15
[58] Field of Search ............... 350/96.15, 96.16, 96.18

[56] References Cited

U.S. PATENT DOCUMENTS

| | | | |
|---|---|---|---|
| 4,239,331 | 12/1980 | Aoyama | 350/96.15 |
| 4,245,884 | 1/1981 | Magura et al. | 350/96.15 |
| 4,261,638 | 4/1981 | Wagner | 350/96.15 |
| 4,277,134 | 7/1981 | Upton | 350/96.15 |
| 4,302,069 | 11/1981 | Niemi | 350/96.15 |
| 4,329,017 | 5/1982 | Kapany et al. | 350/96.15 |
| 4,379,409 | 4/1983 | Primbisch et al. | 350/96.15 |
| 4,401,360 | 8/1983 | Streckmann et al. | 350/96.15 |
| 4,469,941 | 9/1984 | Palmer | 350/96.15 |
| 4,482,805 | 11/1984 | Palmer | 350/96.15 |
| 4,525,025 | 6/1985 | Hohmann et al. | 350/96.15 |

FOREIGN PATENT DOCUMENTS 045492  7/1984  European Pat. Off. ......... 350/96.15

OTHER PUBLICATIONS

Burke et al; "Fiber Optic Repeater Bypass Switch"; IBM Technical Discl. Bull.; vol. 18, No. 2; Jul. 1975; pp. 481, 482.
Bealle; "Parabolic Coupler for Fibre Optics"; IBM Technical Discl. Bull.; vol. 23, No. 3, Aug. 1980; p. 978.

Primary Examiner—William L. Sikes
Assistant Examiner—Robert E. Wise
Attorney, Agent, or Firm—Guy W. Shoup

[57] ABSTRACT

A light-reflective type rotary encoder used to measure the rotational frequency of a rotating shaft, the distance travelled by a sliding body, or other physical quantity has a casing body in which a rotor is rotatably held. Two input optical fibers laid parallel to each other and an output optical fiber laid between the input fibers are held in the casing body in such a way that each one end of these fibers is arranged in line and opposed to the fringe of the rotor on which reflective areas and non-reflective areas are alternately formed at regular intervals circumferentially. The other ends of the fibers which are disposed on the open end side of the casing body are surrounded and covered by a device-mounting case which is detachably mounted to the casing body and which holds a light-emitting device and light-receiving devices therein.

5 Claims, 10 Drawing Figures

ROTARY ENCODER

FIELD OF THE INVENTION

The present invention relates to a rotary encoder which is used with optical fibers to transmit and receive light.

BACKGROUND OF THE INVENTION

Generally, optical rotary encoders used to measure the rotational frequency of a rotating shaft, the distance traveled by a sliding body, or other physical quantity are classified into two categories: light reflective type and light transmissive type. A rotary encoder of light reflective type is shown in FIGS. 1 and 2, where a disk 1 is mounted on a rotating shaft (not shown). The fringe of the disk 1 is provided with reflective areas 2 equally spaced apart circumferentially. Non-reflective areas 3 are formed between the successive reflective areas 2. Disposed close to the fringe of the disk 1 are device-mounting members 4 (only one is shown) each of which is provided with holes 5 and 6. A light-emitting device 7 such as light-emitting diode is fitted in each hole 5, while a light-receiving device 8 is fitted in each hole 6. When the reflective areas 2 on the disk 1 are brought into opposition to some pair of the holes 5 and 6, the light emitted by the corresponding light-emitting device 7 is reflected by the reflective areas 2 and fall on the corresponding light-receiving device 8.

In the rotary encoder constructed as described above, the disk 1 and the device mounting members 4 are mounted within one casing, and the mounting members 4 are disposed at regular intervals near the fringe of the disk 1. Therefore, it has been impossible to make the whole assembly thin. Further, it has been difficult to mount the components.

SUMMARY OF THE INVENTION

Accordingly, it is the object of the present invention to provide a rotary encoder the components of which can easily be mounted and which can be made thin or small with high accuracy and in an economical manner.

This object is achieved in accordance with the teachings of the present invention by a rotary encoder which comprises: a casing body; a rotor rotatably held in the casing body; reflective areas and non-reflective areas which are alternately formed on the fringe of the rotor at regular intervals circumferentially; two input optical fibers laid parallel to each other and held in the casing body; an output optical fiber laid between the input optical fibers and held in the casing body; each one end surface of the optical fibers being arranged in line and opposed to the fringe of the rotor, the other end surfaces of the optical fibers being disposed on the open end side of the casing body; device-mounting case detachably mounted to the casing body so as to cover the other end surfaces of the optical fibers; light-emitting devices opposed to said other end surface of the output optical fiber and mounted in the device-mounting case; and light-receiving devices opposed to said other end surfaces of the input optical fibers and mounted in the device-mounting case.

DETAILED DESCRIPTION OF THE INVENTION

Figure 1:
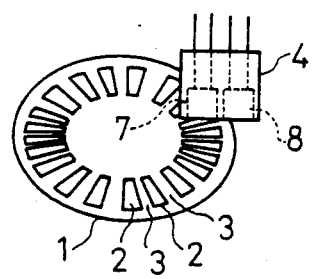
FIG. 1 is a view for illustrating a conventional reflective type rotary encoder.
Figure 2:
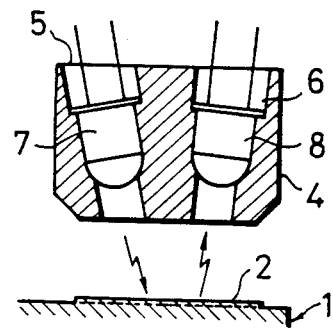
FIG. 2 is an enlarged cross section of the main portion of FIG. 1.
Figure 3:
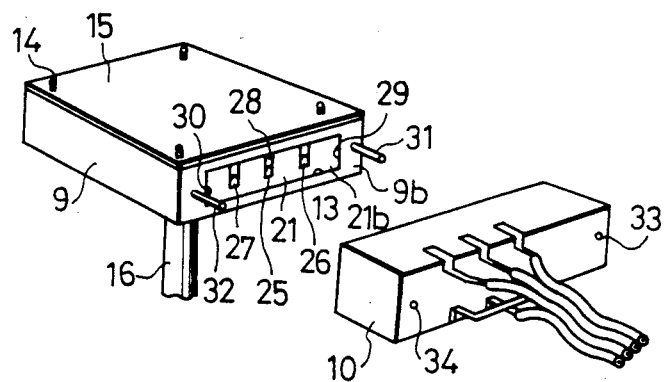
FIG. 3 is a fragmentary exploded perspective view of a rotary encoder according to the present invention.
Figure 4:
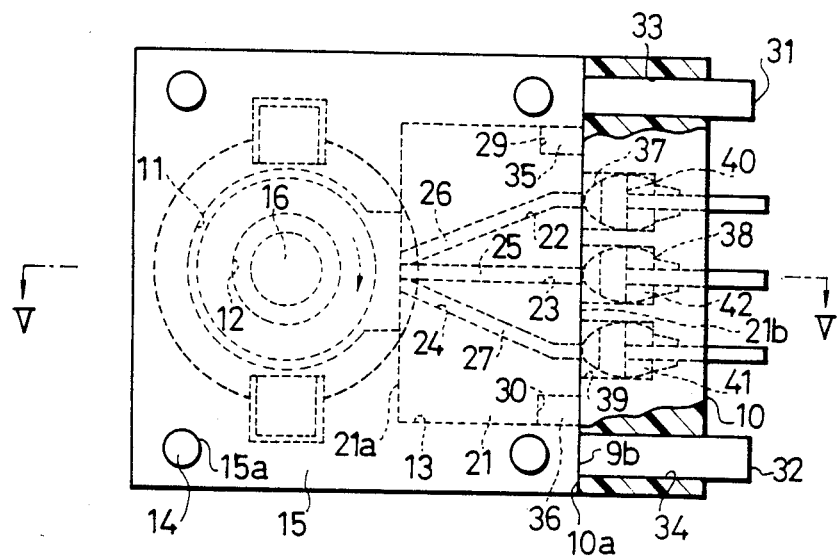
FIG. 4 is a plan view of the encoder shown in FIG. 3.
Figure 5:
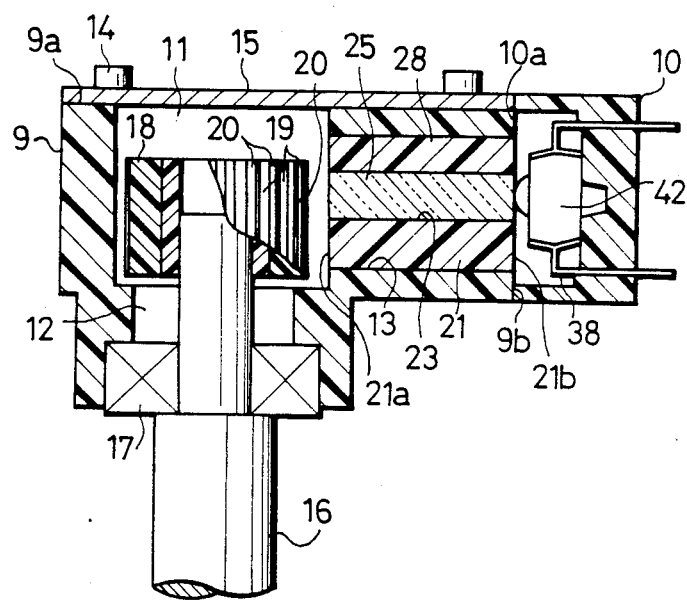
FIG. 5 is a cross-sectional view taken on the line V—V of FIG. 4.

Referring to FIGS. 3–5, there is shown a rotary encoder embodying the concept of the present invention. This encoder has a casing body 9 and a casing 10 for mounting devices therein. As shown in FIG. 5, the body 9 is provided with a circular rotor chamber 11 extending to the top surface 9a, a hole 12 coaxial with the rotor chamber 11 for receiving a shaft (described later), and a hole 13 extending to the inner surface of the chamber 11 and also to one side surface 9b (outer surface) of the body 9. Retaining protrusions 14 extend upright from the four corners of the top surface 9a. These protrusions 14 are fitted in retaining holes 15a formed at the four corners of a cover 15 which is made contact with the top surface 9a. Thus, the cover 15 is fixed to the casing body 9 and closes the opening at the upper end of the rotor chamber 11.

One end portion of a shaft 16 which is inserted into the hole 12 is disposed in the rotor chamber 11 in coaxial relation to the chamber. The shaft 16 is rotatably held to the casing body 9 via bearings 17 and has one end to which a cylindrical rotor 18 is fixedly secured. Reflective areas 19 and non-reflective areas 20 are alternately formed at regular intervals on the fringe of the rotor 18 that is disposed within the rotor chamber 11.

Figure 6:
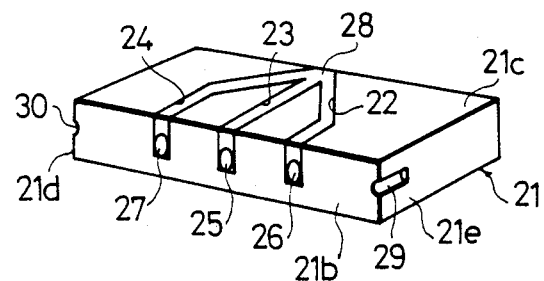
FIGS. 6 and 7 are perspective views of the fiber holding member shown in FIG. 5.
Figure 7:
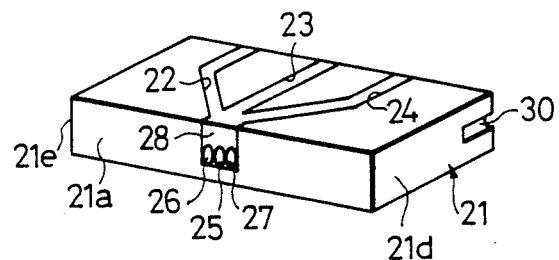

A fiber holding member 21 shown in FIGS. 6 and 7 is fitted in the hole 13 and has three branching grooves 22, 23, and 24 which are formed in a surface 21a opposite to the rotor 18, an outside surface 21b on the opposite side of the surface 21a, and the top surface 21c, respectively. Each one end of the grooves 22–24 collects together in the center of the surface 21a opposite to the rotor 18. An output optical fiber 25 is laid on the bottom of the middle groove 23, while input optical fibers 26 and 27 are laid on the bottoms of the grooves 22 and 24, respectively. Each upper portion of the grooves 22–24 is filled with resin 28 for anchoring the fibers. In this way, each one end surface of the fibers 25–27 is arranged in line at the surface 21a, as shown in FIG. 4, and is opposed to the periphery of the rotor 18. Further, as may be seen from the figure, these ends of the fibers 25–27 are parallel to one another along the tangent to the rotor 18 that is parallel to the surface 21a. A groove 29 is formed in one side surface 21e of the holding member 21 and extends to an outer surface 21b. Similarly, a groove 30 is formed in the opposite side surface 21d and extends to the outer surface 21b.

Retaining pins 31 and 32 protrude from opposite sides of one side surface 9b of the casing body 9. The device-mounting casing 10 is provided with holes 33 and 34 at opposite sides thereof such that the pins 31 and 32 fit in them, respectively. One side surface 10a of the casing 10 faces the side surface 9b, and protrusions 35 and 36 extending from opposite sides of this surface 10a engage the grooves 29 and 30, respectively. The mounting casing 10 is detachably mounted to the casing body 9 and covers the exposed, outer ends of the optical fibers 25–27 on the opening end side of the body 9 by means of the structure thus far described.

Figure 8:
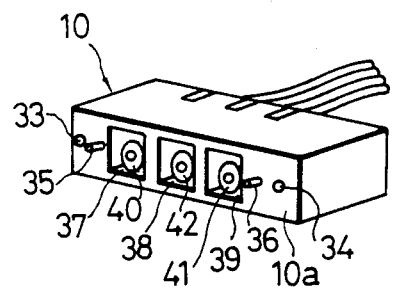
FIG. 8 is a perspective view of the device-mounting case shown in FIG. 3.

Referring to FIG. 8, the side surface 10a is provided with recesses 37, 38, and 39. Light-receiving devices 40 and 41 which are opposite to the outer end surfaces of the fibers 26 and 27 are mounted in the recesses 37 and 39, respectively. A light-receiving device 42 that is opposite to the outer end surface of the fiber 25 is mounted in the recess 38.

The functions and assembly of the rotary encoder constructed as described above are next described together with other setting conditions.

Figure 9:
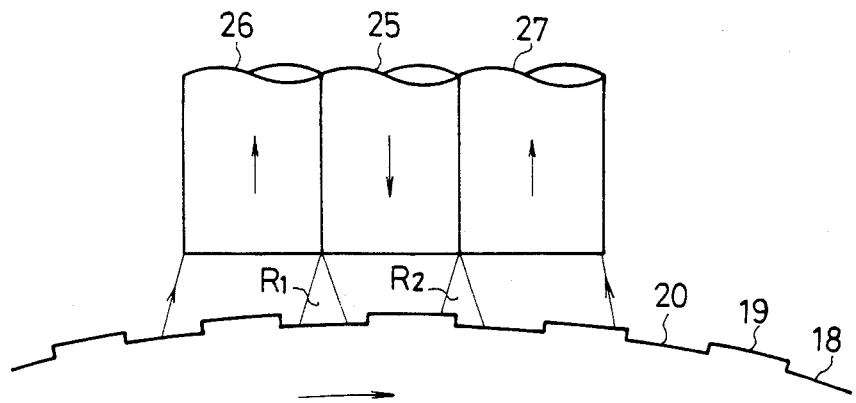
FIG. 9 is a view for illustrating the operation of the rotary encoder shown in FIGS. 3 and 4.

Referring next to FIG. 9, the light emanating from one end surface of the output optical fiber 25 is reflected by the reflected area 19, but only parts of the light which fall on regions $R_1$ and $R_2$ are allowed to enter the input optical fibers 26 and 27, respectively. It is now assumed that the rotor 18 is rotating in a direction indicated by the arrow of the figure. Adjustments are made so that the left half of the effective reflective region $R_2$ may be occupied by the reflective area 19 and that the right half of the region $R_2$ may be occupied by one non-reflective area 18 when the effective reflective region $R_1$ lies in the center of another non-reflective area 20.

Figure 10:
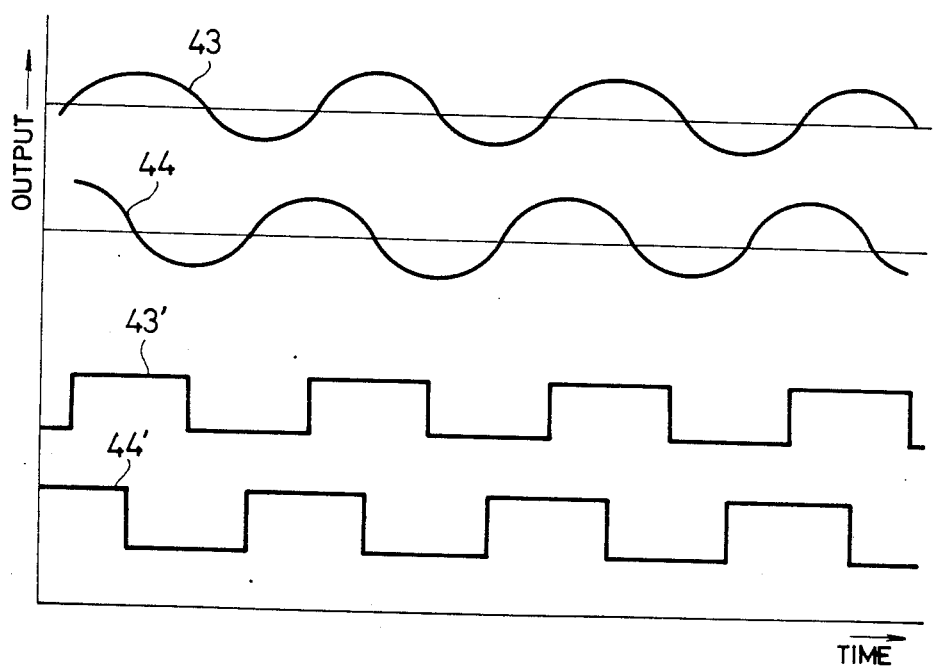
FIG. 10 is a waveform diagram of the outputs delivered from the encoder shown in FIG. 9.

Under these conditions, the light emitted by the light-emitting device 42 is directed toward the periphery of the rotor 18 through the optical fiber 25. As the rotor 18 turns, this light falls on the reflective areas 19 in succession and is reflected. Some of the reflected light reaches the light-receiving device 40 through the fiber 26, whereas the remaining light arrives at the light receiving device 41 through the fiber 27. Thus, the device 41 produces an output waveform 43, while the light-receiving device 40 delivers an output waveform 44 that is 90° out of phase with the waveform 43, as shown in FIG. 10. Also shown in FIG. 10 are pulse waveforms 43' and 44' which have been obtained by modifying the output waveforms 43 and 44, respectively.

If the rotor 18 is rotated in the reverse direction, then the output waveforms 43 and 44 are produced in the reverse sequence. Hence, it is possible to correctly sense the direction of rotation of the rotor 18. Further, a larger output level can be obtained by adding the two waveforms 43 and 44, even if the distance between the successive reflective areas 19 and non-reflective areas 20 is minute. In this case, the difference between the high level and the low level increases, enhancing the resolution.

The device-mounting casing 10 is mounted in the casing body 9 by inserting the pins 31 and 32 into the holes 33 and 34, respectively, and inserting the protrusions 35 and 36 into the grooves 29 and 30, respectively. The casing 10 can be detached from the body 9 by the reverse procedures. Therefore, the light-emitting device 42 and the light-receiving device 40, 41 can be easily replaced.

As thus far described, the rotary encoder according to the invention comprises: a casing body; a rotor rotatably held in the casing body; reflective areas and non-reflective areas which are alternately formed on the fringe of the rotor at regular intervals circumferentially; two input optical fibers laid parallel to each other and held in the casing body; an output optical fiber laid between the input optical fibers and held in the casing body; each one end surface of the optical fibers being arranged in line and opposed to the fringe of the rotor, the other end surfaces of the optical fibers being disposed on the open end side of the casing body; device-mounting case detachably mounted to the casing body so as to cover the other end surfaces of the optical fibers; light-emitting devices opposed to said other end surface of the output optical fiber and mounted in the device mounting case; and light-receiving devices opposed to said other end surfaces of the input optical fibers and mounted in the device-mounting case. Consequently, the components can be readily installed. Especially, the light-emitting device and the light-receiving devices can be easily mounted in the casing body. Hence, it is also easy to replace these optical devices.

In addition, the light-emitting device and the light-receiving devices can be mounted at any desired position by the use of optical fibers. This helps make the whole construction thin or small. Furthermore, since the output optical fiber is laid between the two input optical fibers, a larger output level can be obtained by adding the outputs from the two light-receiving devices corresponding to the two input optical fibers. As a result, even if the distance between the successive reflective areas and non-reflective areas is minute, the difference between the low level and the high level is increased, thereby improving the resolution.

What is claimed is:

1. A rotary encoder comprising:
  a casing body;
  a rotor rotatably held in the casing body;
  reflective areas and non-reflective areas which are alternately formed on the fringe of the rotor at regular intervals circumferentially;
  two input optical fibers laid parallel to each other and held in the casing body;
  an output optical fiber laid between the input optical fibers and held in the casing body;
  each one end surface of the optical fibers being arranged in line and opposed to the fringe of the rotor, the other end surfaces of the optical fibers being disposed on the open end side of the casing body;
  device-mounting case detachably mounted to the casing body so as to cover the other end surfaces of the optical fibers;
  light-emitting devices opposed to said other end surface of the output optical fiber and mounted in the device-mounting case; and
  light-receiving devices opposed to said other end surfaces of the input optical fibers and mounted in the device-mounting case.

2. A rotary encoder as set forth in claim 1, wherein the casing body has a rotor chamber in which the rotor is received, and wherein one side surface of the casing body is provided with a hole extending to the inner surface of the rotor chamber to fitly receive a fiber holding member on which optical fibers are held.

3. A rotary encoder as set forth in claim 2, wherein the fiber holding member is provided with grooves in one side surface thereof, and wherein the device-mounting casing has protrusions engaging these grooves and is provided with holes in which retaining pins mounted on one side surface of the casing body fit.

4. A rotary encoder as set forth in claim 3, wherein one-half of effective reflective region $R_2$ is occupied by one reflective area and the remaining half is occupied by one non-reflective area when effective reflective region $R_1$ lies in the center of another non-reflective area.

5. A rotary encoder as set forth in claim 2, wherein one-half of effective reflective region $R_2$ is occupied by one reflective area and the remaining half is occupied by one non-reflective area when effective reflective region $R_1$ lies in the center of another non-reflective area.

* * * * *